Sept. 25, 1928.
O. B. BJORGE
1,685,519
DEMOUNTABLE WINDING DRUM
Filed Sept. 6, 1924
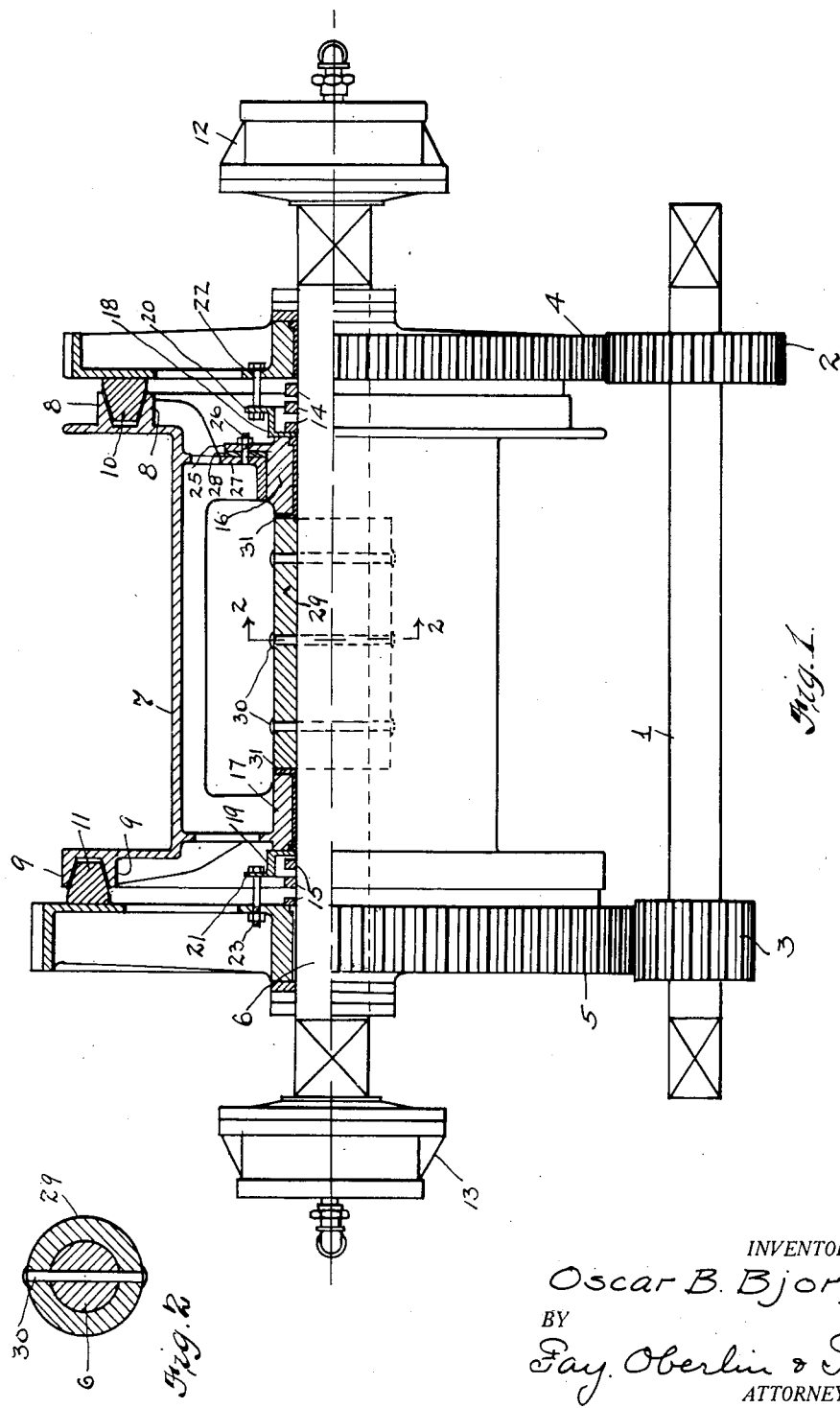
INVENTOR.
Oscar B. Bjorge
BY
Fay, Oberlin & Fay
ATTORNEYS.

Patented Sept. 25, 1928.

1,685,519

UNITED STATES PATENT OFFICE.

OSCAR B. BJORGE, OF PORTLAND, OREGON, ASSIGNOR TO CLYDE IRON WORKS, OF DULUTH, MINNESOTA, A CORPORATION OF MAINE.

DEMOUNTABLE WINDING DRUM.

Application filed September 6, 1924. Serial No. 736,260.

In logging engines and in other related types of hoisting mechanism, in which cable winding drums are employed, a convenient arrangement for driving such a drum at two different speeds, as frequently is desirable, consists in loosely mounting the drum on a shaft between gears of different diameters, such gears in turn meshing with suitable pinions fixed on an adjacent driving shaft. By clutching one or the other of the aforesaid gears to the adjacent end of the drum, the latter may accordingly be driven at a rate of speed corresponding with the gear ratio of either such pair of gears and pinions.

The object of the present invention is to provide an improved mounting for a two-speed drum of the type in question, whereby the necessity of using a shaft of special shouldered construction is obviated. The construction is at the same time simplified in other respects and provision is made for taking up the wear which inevitably occurs in mechanism of this type.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is partly an elevation and partly a central vertical section of my improved two speed drive for a cable winding drum; and Fig. 2 is a transverse section of a detail, the plane of such section being indicated by the line 2—2, Fig. 1.

For the purpose in hand it has been deemed unnecessary to illustrate the engine proper, but only the crank shaft 1 thereof, which constitutes the drive shaft for the mechanism of present interest. Said crank shaft is provided with two pinions 2 and 3, keyed or otherwise fixedly secured thereto and of different diameters which are complementary to the diameters of two corresponding gears 4 and 5 rotatably mounted on a drum shaft 6 parallel with said crank shaft 1. As conventionally indicated, said crank shaft is designed to be journaled in suitable bearings in a frame (not shown).

Rotatably mounted on shaft 6 between the two gears 4 and 5 is a drum 7, the respective ends of which are provided on their outwardly directed faces with pairs of concentric ribs 8, 8, and 9, 9, the juxtaposed faces of such ribs being beveled to co-operate with the correspondingly beveled sides of a friction ring 10 on gear 4 in the one case and with a similar ring 11 on gear 5 in the other case. The gears are longitudinally movable on shaft 6 as well as rotatable thereabout, and such ribs and rings constitute friction driving means so that when either gear 4 or 5 is forced inwardly towards drum 7, it will serve as a driver for said drum. Obviously, depending upon which gear is thus clutched to the drum, the latter will be driven at a rate of speed corresponding with the ratio of such gear and the corresponding pinion on drive shaft 1.

Various means may be employed for moving either gear 4 or 5 inwardly as desired, so as to force the same into driving connection with drum 7 in the fashion just described, the means illustrated consisting of steam thrust cylinders 12 and 13, of familiar design, one on each end of said shaft 6. By admitting steam or other pressure fluid into such cylinders, it will be understood that the corresponding gear will be forced inwardly. Normally, or in the neutral position of the parts shown in Fig. 1 of the drawing, both gears are disengaged from the drum, being respectively held thus disengaged by compression springs 14 and 15, interposed between the corresponding hub ends 16 and 17 of the drum. Preferably, the inner ends of the springs 14 and 15 do not bear directly against such hub ends but against interposed bridle plates 18 and 19 of angular cross-section, as shown, and having radially projecting flanges or ears 20 and 21, respectively. Bolts 22 and 23 tie the respective gears to such flanges or ears 20 and 21 so as to limit the outward movement of the gears longitudinally of shaft 6.

It is of course essential to the operation of the mechanism in the manner hereinbefore indicated that the drum 7 be held against endwise movement, i. e., movement longitudinally of the shaft 6, otherwise neither of the gears 4 and 5 could be forced into effective driving engagement with said drum. It will be noted that while hub end 17 is integral with the body of the drum, the other end 16 constitutes a separate member that is provided with an outwardly directed encircling flange 25, by means of which it is secured, through the medium of bolts 26, to the inwardly directed flange 27 which forms the corresponding end of the drum and which, as shown, has a wide cylindrical abutment surrounding and engaging the separable member 16. An annular plate or shim 28 is interposed between such flanges 25 and 27 and by varying the thickness of such shim, the longitudinal location of the hub end 16, with respect to the other hub end, may be correspondingly adjusted. Between such two hub ends, i. e., wholly contained within the drum, there is secured to the shaft 6 a collar 29 held in place by pins 30 that pass directly through the shaft, as shown in Fig. 2, and so serve to hold said collar against endwise movement on the shaft. The respective ends of the collar form shoulders that abut directly against the hub ends 16 and 17 (save for interposed bearing plates 31) and the drum, it will thus be seen, is securely held against longitudinal movement on said shaft, as is necessary.

The drum may be readily assembled on the shaft or dis-assembled therefrom by simply disengaging the separate hub end 16 in the fashion already described, whereupon the corresponding end of the drum proper will clear the collar 29. In other words, when such separate hub end is thus disengaged, the drum may be withdrawn from the opposite end of the shaft. This assumes, of course, that the shaft has been removed from its bearings and that gear 5 and attached parts have been taken off. It will be noted, in conclusion, that when the drum is assembled on the shaft, by interposing a shim 28 of proper thickness, any wear that may occur in the end bearings 31 between the hub ends and the collar 29 may be readily compensated for or taken up.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a shaft, a drum freely rotatably mounted thereon, a cylindrical collar fixed on said shaft within the drum and adapted to be engaged by the respective hub ends of the drum, one such hub-end being separable from the drum, and a cylindrical abutment carried by said drum to surround and be supported by the separable hub.

2. In mechanism of the character described, the combination of a shaft, a drum freely rotatably mounted thereon, driving means on said shaft adjacent the drum and optionally connectible therewith, said drum having a rope-receiving shell with integral end-walls, and having at one end an inwardly directed flange integral with a hub and at the other end an inwardly directed flange integral with a cylindrical abutment, a hub-member upon which such cylindrical abutment is adapted to fit, said hub-member having an outwardly directed flange overlapping the inwardly directed flange, and means for holding said flanges together, said driving means being free from obstruction end-wise of said holding means.

3. In power transmission mechanism, the combination of a drive shaft, a second shaft parallel therewith, two pairs of intermeshing gears of different ratios, one of each such pair of gears being fixed on said drive shaft and the other being rotatably mounted on said second shaft and also longitudinally movable thereon, a winding drum rotatably mounted on said second shaft between the two gears, and means for selectively clutching said gears and said drum, said drum having a rope-receiving shell with integral end-walls, and having at one end an inwardly directed flange integral with a hub and at the other end an inwardly directed flange integral with a cylindrical abutment, a hub member upon which such cylindrical abutment is adapted to fit, said hub member having an outwardly directed flange overlapping the inwardly directed drum flange, and means for holding said flanges together, said gearing adjacent the flange-holding means being free from obstruction thereto.

4. In power transmission mechanism, the combination of a drive shaft, a second shaft parallel therewith, two pairs of meshing gears of different ratios, one of each such pair of gears being fixed on said drive shaft and the other being rotatably mounted on said second shaft and also longitudinally movable thereon, a winding drum rotatably mounted on said second shaft between the two gears, said gears being adapted to engage with said drum on movement toward the same, means adapted to move either of said gears on said second shaft into engagement with said drum as desired, a cylindrical collar fixedly secured on said second shaft within said drum and against which the drum hubs engage, one such hub being separable from the drum, and a cylindrical abutment carried by said drum to surround and be supported by the separable hub.

Signed by me, this 2nd day of September, 1924.

OSCAR B. BJORGE.